United States Patent
Luciano

[19]

[11] Patent Number: 6,101,367
[45] Date of Patent: Aug. 8, 2000

[54] COMBINATION QUESTION-ANSWER BOOK AND ANSWER DISPLAY

[76] Inventor: Philip P. Luciano, 812 Collins Ave., Pittsburgh, Pa. 15206

[21] Appl. No.: 09/399,249

[22] Filed: Sep. 20, 1999

Related U.S. Application Data

[60] Provisional application No. 60/102,106, Sep. 28, 1998.
[51] Int. Cl.$^7$ .................................................. G09B 5/00
[52] U.S. Cl. .......................................... 434/308; 434/178
[58] Field of Search .................................. 434/178, 308, 434/309, 311, 315, 317, 322, 331, 335

[56] References Cited

U.S. PATENT DOCUMENTS

| | | | |
|---|---|---|---|
| 4,682,958 | 7/1987 | Slavik et al. | 434/335 |
| 4,778,391 | 10/1988 | Weiner | 434/178 |
| 4,884,974 | 12/1989 | Desmet | 434/317 |
| 4,978,305 | 12/1990 | Kraft | 434/353 |
| 5,059,126 | 10/1991 | Kimball | 434/308 |
| 5,379,213 | 1/1995 | Derks | 364/411 |
| 5,433,610 | 7/1995 | Godfrey et al. | 434/308 X |
| 5,574,519 | 11/1996 | Manico et al. | 434/308 X |
| 5,697,793 | 12/1997 | Huffman et al. | 343/317 |
| 5,878,292 | 3/1999 | Bell et al. | 434/308 |
| 5,899,700 | 5/1999 | Williams et al. | 434/308 |
| 6,011,949 | 1/2000 | Shimomukai | 434/308 X |

*Primary Examiner*—Sam Rimell
*Attorney, Agent, or Firm*—Carothers and Carothers

[57] ABSTRACT

A combination question-answer book and a separate answer display for reading and displaying the answers to each question provided on the respective pages of the book. Microprocessor chips are secured to protruding ears extending from an edge of each page for being read by a digital microprocessor chip reader. Each microprocessor chip is programmed with answer information specific to the page with which it is associated and a portable handheld digital display reader may be positioned relative to each chip to respectively read the chips and display the respective answer information for each associated page.

3 Claims, 2 Drawing Sheets

COMBINATION QUESTION-ANSWER BOOK AND ANSWER DISPLAY

CROSS REFERENCE

This patent application is a regular patent application based in priority on pending U.S. Provisional Patent Application No. 60/102,106, filed Sep. 28, 1998, entitled SAGE-CHILDREN'S BOOK SERIES (ANSWER RETRIEVAL SYSTEM, A.R.S.).

BACKGROUND OF THE INVENTION

The present invention relates to a teaching system, and more particularly to the combination of a question-answer book and separate answer display.

The present invention utilizes an answer retrieval system for independently retrieving correct answers from questions or informational requests set forth in the book, for example, in educational books for children which might be related to subjects of math, grammar, history, geography, mystery, etc.

SUMMARY OF THE INVENTION

The question-answer book and answer display combination of the present invention includes a book having front and back covers and a plurality of identifiable pages bound between the cover. The pages have printed thereon question text.

For example, the questioned text might be related to any number of subjects, such as, mathematics, grammar, history, geography, mystery, etc.

A microprocessor chip is secured to an outer marginal edge portion of each page and positioned for being read by a microprocessor chip reader. Each microprocessor chip is programmed with answer information specific to the page with which the microprocessor chip is attached and associated.

A small portable handheld digital display microprocessor chip reader is provided and is positionable over or relative to each of the chips for respectively reading the chips and displaying the respective answer information thereon for each associated page.

The outer marginal edge portions of each page whereon the microprocessor chips are embedded or adhered, preferably consist of protruding ears which extend from an edge of each page.

In addition, the page material is made substantially rigid in order to prevent folding of the pages when the reader is applied to each of the chips for reading.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF THE PREFERRED EMBODIMENTS

Figure 1:
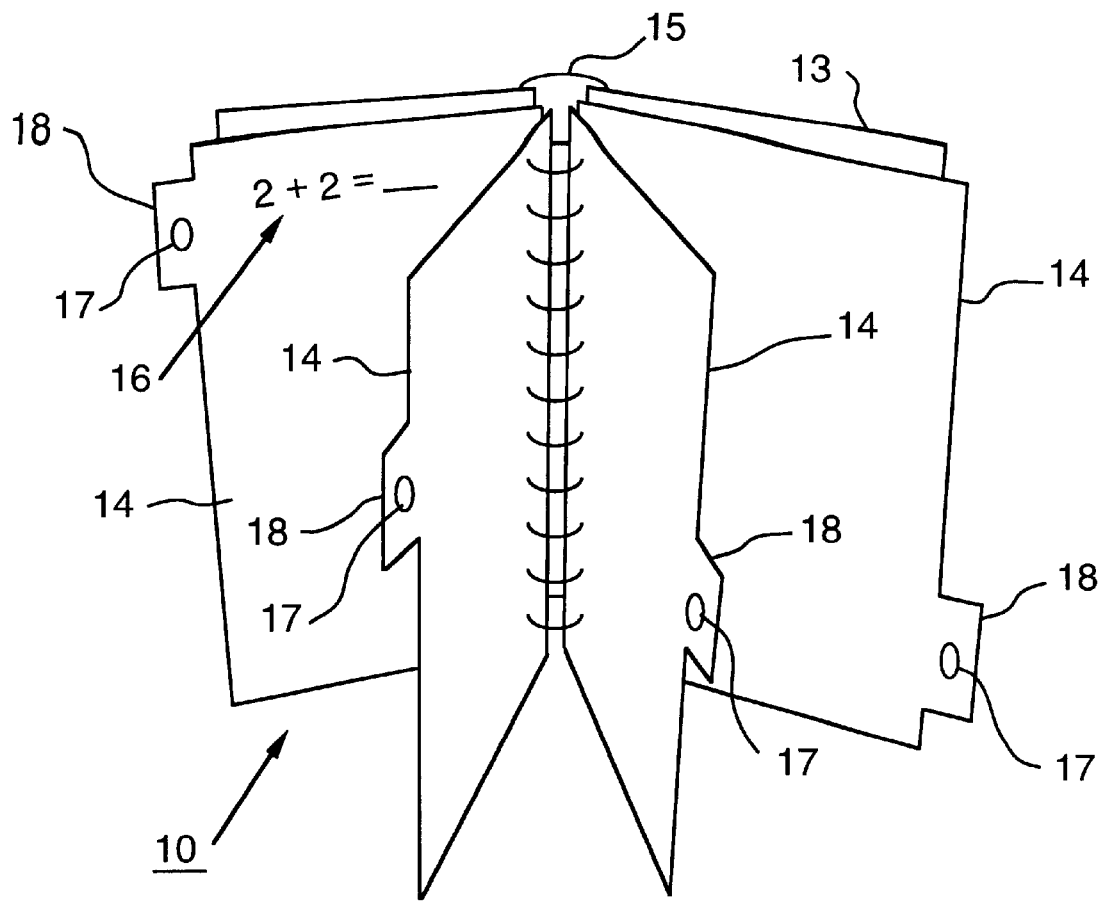
FIG. 1 is a schematic perspective view of one embodiment of the question-answer educational book portion of the assembly or combination of the present invention.
Figure 2:
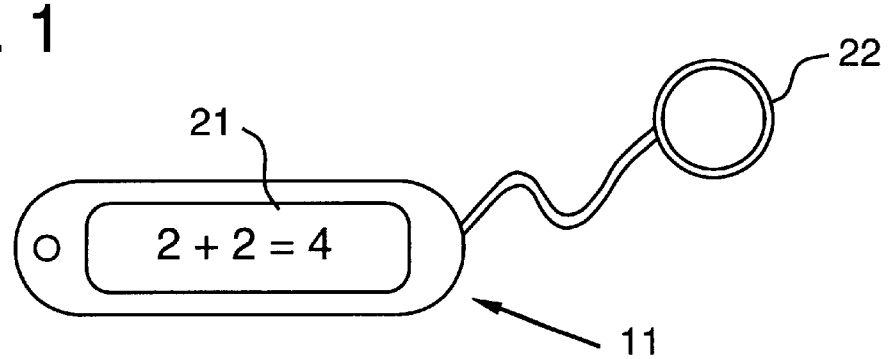
FIG. 2 is a schematic plan view of a digital display reader portion of the assembly of the present invention for reading the respective preprogrammed microchip processors provided on the book illustrated in FIG. 1.
Figure 3:
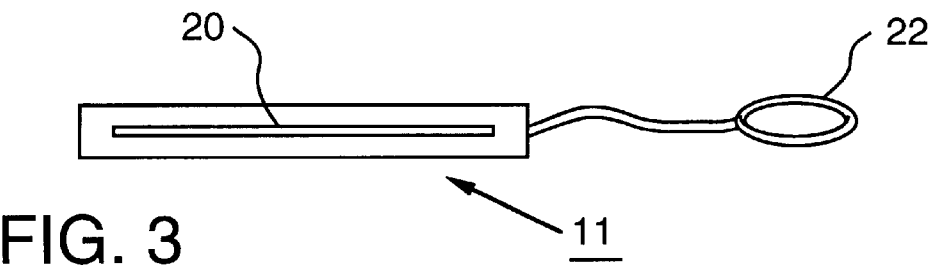
FIG. 3 is a schematic view in side elevation of the digital display reader shown in FIG. 1.

Referring to FIGS. 1, 2 and 3, the question-answer book 10 of the combination or assembly of the present invention is illustrated in FIG. 1 and the answer display 11 is illustrated in FIGS. 2 and 3.

The book 10 is provided with front and back covers 12 and 13 (which may also function as pages if desired) in a plurality of identifiable (different numbered) pages 14 bound with spiral binding 15, between covers 12 and 13. The pages 14 have question text printed thereon as illustrated at 16, which is here shown as a mathematical question of two plus two equals blank.

Much additional text or indicia would naturally be imprinted on each of the pages and only one illustration is here provided.

In addition, many other book topics could be included for question subject matter besides mathematics, such as grammar, history, geography, mystery, etc.

Microprocessor chips 17 are secured to or embedded in outer marginal edge portions 18 of each page 17, and they are thus positioned for being read by a handheld microprocessor chip reader as illustrated in FIGS. 2 and 3.

Each microprocessor chip 17 is programmed with answer information specific to the page with which the chip is attached or associated. The portable handheld digital display reader 11 is provided with a reader slot 20 which makes the reader positionable over or relative to the chips 17 for respectively reading the chips and displaying the respective answer information for each associated page on its digital display 21.

The outer marginal edge protrusions 18 are provided here in the form of protruding ears 18 which extend from an edge of each page. This permits the respective ears 18, together with their adhered microprocessor chips, to be readily inserted in slot 20 of reader 11 to properly and quickly register in reader 11 for appropriate communication with the reader. In order to further insure that the respective pages 14 and protruding ears 18 will not bend or fold or otherwise distort when reader 11 is positioned over the respective ears 18, the pages 14 are constructed of a relatively or substantially rigid sheet material.

The reader 11 is provided with a conventional key chain attachment 22 for storage securement to the book or elsewhere for storage.

The microprocessor chips 17 are commonly available on the market and they are generally no larger than the approximate size of a dime in US currency. Such microprocessor chips are extensively used in debit cards which are generally prepaid cards which keep a record of the paid-for credit available. Such debit cards are very commonly used in many different industries but most commonly used as prepaid telephone cards, and are referred to as Smartcards.

On such cards, the microprocessor chips appear to be gold in color and dime sized in shape.

The microprocessor chip readers 11 are also available on the market for reading the microprocessor chips on such Smartcards and the end of such cards bearing the microprocessor chip is merely inserted into the conventional reader and the display quickly reads and communicates the credit time or money left on the debit card. The digital display reader for the present invention would be of an identical nature, but preferably more compact and smaller in physical shape.

Depending upon the manufacture, these microprocessor chips 17 are divided into six or eight demarcated areas. The chips 17 are the contacts (although not physical contacts) employed by the micro-circuitry in the reader 11 to communicate with the complimentary digital display reader interface that understands and reads the information stored in the writeable memory portion of the microprocessor chip.

These contacts are the physical links between the chip micro-circuit and the accepting reader interface. Each of the six or eight areas demarcated on the chip may be represented normally as memory areas, the central processing (CPU), the protection circuit, the reset circuit, the clock, and the input-output area.

Thus these microprocessor chips 17 include a control and logic unit wherein the logic unit recognizes a signal sent to the chip and automatically responds by sending a predetermined identification code. The signal from the microprocessor chip is received using a contact communication device in a form of the reader 11 and displays in digital bit serial form the information on its display 21.

Each chip 17 is pre-programmable and the control and logic unit thereof automatically accepts the information received through its input circuits and stores the information in a writeable memory in the chip 17. This is, of course, information necessary to answer the blank in each question provided on the pages of the educational book 10.

As previously explained, retrieval of information stored in the memory of each microprocessor chip 17 on each page of the book is performed by insertion of the digital display reader slot 21 over each microprocessor chip 17 until it is properly registered and the reader recognizes the predetermined identification code. Thereafter, the digital display 21 of the reader will display the correct answer.

A predefined algorithm within the control and logic unit in each microprocessor chip 17 governs the whole process of the signal recognition transmission of the identification code and the retrieval of the information or answers on the chip 17 via the digital display reader 11.

Figure 4:
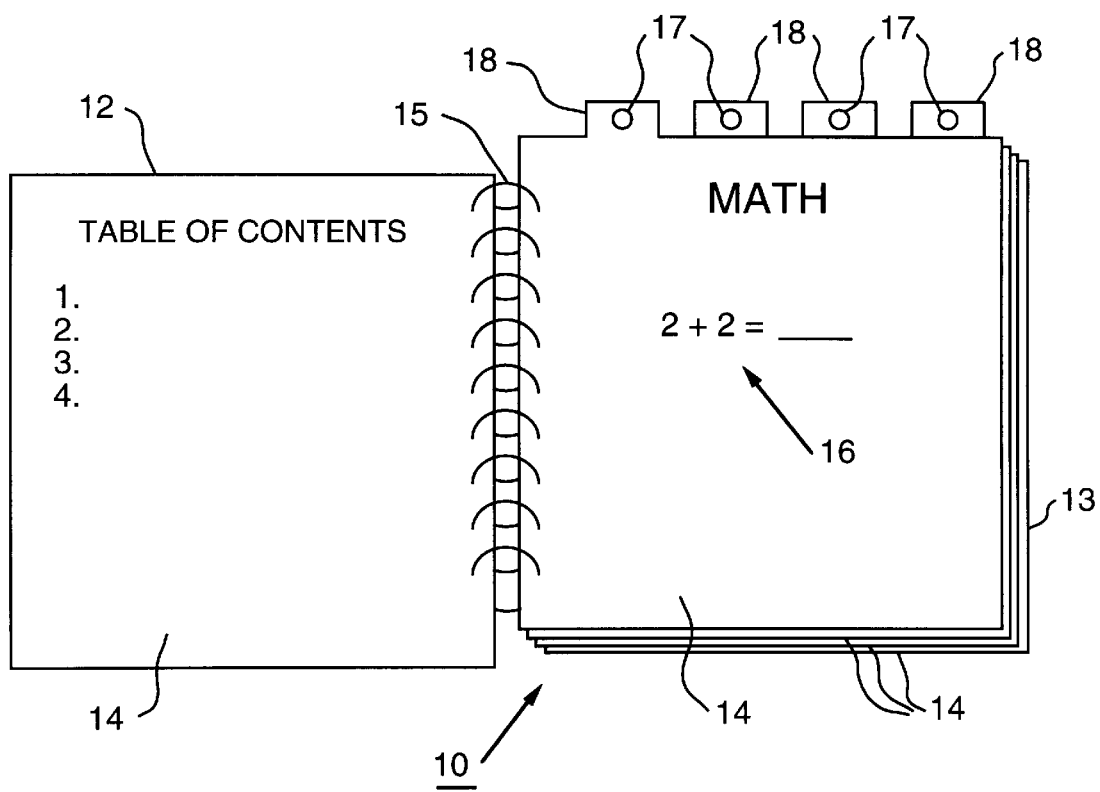
FIG. 4 is a schematic view illustrating another embodiment of the educational question-answer book portion of the assembly of the present invention.

Turning next to FIG. 4, another embodiment of the book 10 portion of the assembly or combination is illustrated and like or identical elements are designated with the same reference numerals.

The only difference between the book 10 illustrated in FIG. 4 from that illustrated in FIG. 1 is that the ears 18 are provided at the top of each page 14 instead of at the side edges.

The same reader illustrated in FIGS. 2 and 3 is utilized to read the microprocessor chips 17 in this embodiment.

I claim:

1. A question-answer book and answer display assembly comprising:

a book having front and back covers and a plurality of identifiable pages bound between the covers, and the pages having printed question text thereon;

a microprocessor chip secured to an outer marginal edge portion of each page and positioned thereon for being read by a microprocessor chip reader, and each chip programmed with answer information specific to the page with which it is associated; and a portable hand held digital display reader which is positionable relative to the chips for respectively reading the chips and displaying the respective answer information for each associated page.

2. The question-answer book and answer display assembly of claim 1 wherein said outer marginal edge portions are protruding ears extending from an edge of each page.

3. The question-answer book and answer display assembly of claim 1 wherein the pages are substantially rigid for thereby preventing folding of the pages when the reader is applied to the chips for reading.

* * * * *